United States Patent
Arnold (12) 
(10) Patent No.: US 6,385,468 B2
(45) Date of Patent: *May 7, 2002

(54) EXTERNAL CONNECTOR AND BATTERY EXTENSION PACK FOR A PORTABLE COMMUNICATION DEVICE

(75) Inventor: Thomas A. Arnold, Aliso Viejo, CA (US)

(73) Assignee: Conexant Systems, Inc., Newport Beach, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/137,194

(22) Filed: Aug. 20, 1998

(51) Int. Cl.[7] .................................................. H04B 1/38
(52) U.S. Cl. ......................................... 455/572; 455/90
(58) Field of Search ................................ 455/557, 575, 455/572, 90, 351; 379/433, 438; 307/150; 439/500, 503, 504; 320/150, 114, 115

(56) References Cited

U.S. PATENT DOCUMENTS 5,136,229 A * 8/1992 Galvin ......................... 455/572
5,436,625 A * 7/1995 Kubo ............................ 341/22
5,716,230 A * 2/1998 Marren et al. .............. 439/500

* cited by examiner

Primary Examiner—Marsha D. Banks-Harold
(74) Attorney, Agent, or Firm—Knobbe, Martens, Olson & Bear, LLP (57) ABSTRACT

An improved external connector of a portable communication device that is perpendicular to the backplate of the communication device. The external connector is a common interface connector with fourteen data connections and one radio frequency connector. The external connector is placed directly on a circuit board within the communication device and avoids the use of bent leads. This configuration allows removable modules, such as battery extension packs, battery rechargers or system connector packs, to be placed off the backplate of the device. The external connector on the communication device is a female-type connector adapted to receive a male-type connector on the front side of the removable module. The removable module may have a female-type connector on the back side for receiving the male-type connector of another removable module. Multiple removable modules may be stacked on the back of the communication device one on top of another. Because of the thin configuration of the removable modules, multiple removable modules may be used while maintaining the thin profile of the overall operating device. Where the removable module is a system connector pack, the system connector pack may be connected to a laptop or a battery recharger via a flexible cord.

37 Claims, 13 Drawing Sheets

EXTERNAL CONNECTOR AND BATTERY EXTENSION PACK FOR A PORTABLE COMMUNICATION DEVICE

BACKGROUND OF THE INVENTION

1. Field of the Invention

The present invention relates generally to electrical devices. Specifically, the present invention relates to improvements in external connectors and battery extension pack configurations for portable communication devices.

2. Brief Description of the Related Art

As portable electronic devices become smaller, lighter and more common, there is a need to minimize the size and cost of such devices and its associated parts without compromising the usefulness of the device. This is particularly true of portable communication devices. For example, it is desirable in these smaller devices to provide an external connector. Cellular phones require external connectors for data transmission, external antenna, external power supply and battery charging. As portable communication devices become smaller, it is increasingly more difficult to provide such external connectors while conforming to certain desirable form factors. Also, the external connectors should be placed in a convenient location for the user. Cost, however, becomes a significant factor if exotic designs are used.

Similarly, it is desirable to minimize the size and cost of the battery pack for a portable communication device while providing a higher yield cell. Talk time and stand-by time has long been an important feature for cellular phones.

SUMMARY OF THE INVENTION

Current cellular phones use right angle connectors at the base of the phone. This configuration allows a cord attached to the connector to come straight out of the base of the phone. This configuration does not interfere with a user's hand placement and allows the phone to be easily inserted into cradles or charge stations. Placement of the phone in a cradle is awkward because the phone must be inserted and then 'snapped' into place.

Also, some current cellular phones use extended life battery packs that are typically larger than the standard battery pack. Other phones use battery packs which involve more expensive, high-output battery cells such as Lithium Ion cells.

The present invention provides improvements for portable communication devices such as cellular phones. The improvements result in decreased manufacturing costs and also improve useability and convenience of the portable device.

One aspect of the present invention involves an improved external system connector on a portable communication device that is perpendicular to the backplate of the communication device. This configuration allows the improved connector to be placed directly on the circuit board. This reduces the number of pieces for assembly and reduces the cost of manufacturing. The cost is further reduced because the 'footprint' of the improved connector on the circuit board is smaller. The improved connector configuration also allows more freedom for placement of the connector part on the circuit board. The device is well suited for cradle mounting by 'snapping' the device to any horizontal surface.

This configuration also allows removable modules to be placed off the backplate of the device. For example, these removable modules may include a battery extension pack, a battery recharger, a system connector pack or any other device adapted to transfer data or power. A groove is preferably formed on the backplate of the device to receive a removable module. The external connector is preferably a female-type connector adapted to receive a male-type connector on a removable module. In a preferred embodiment, the external connector is a common interface connector with fourteen data connections and one radio frequency connector.

Another aspect of the present invention involves a 'stackable' battery extension pack for a portable communication device. The battery extension pack may supply voltage to the communication device or recharge a battery inside the communication device. The stackable battery extension pack has a male-type common interface connector on its front side and a female-type connector on its backside for receiving a male-type connector of another removable module. Multiple battery extension packs may be stacked on the back of the communication device with one battery extension pack on top of another. Because of the slim configuration of the battery extension packs, multiple battery packs may be used while maintaining the thin profile of the overall operating device. Furthermore, the battery extension pack may be standardized for a range of different communication devices, and thus eliminate additional tooling costs to design new battery pack configurations for each new communication device.

In addition or instead of a battery extension pack, a system connector pack may be attached to the back of the communication device. The system connector pack may be connected via a flexible cord to a laptop computer (via a RS232 or PCMCIA interface), a battery recharger or other device adapted to transfer data or power.

One aspect of the present invention involves a portable communication device comprising a housing, a circuit board mounted within said housing, and a first externally accessible connector mounted perpendicular to and on the circuit Board within the portable communication device. In one embodiment, the communication device is a folding cellular phone. Advantageously, the portable phone has an integrated battery compartment in a hinge of the phone. Preferably, the externally accessible connector extends through a back of said housing, and is adapted to receive a removable expansion module. In one embodiment, the expansion module is a removable power source such as external battery, a power adapter or battery charger. Advantageously, the power adapter comprises an adapter connector configured to mate with said first externally accessible connector and a power cord. In one embodiment, the power cord is adapted for connection to a cigarette lighter receptacle. In another embodiment, the power cord is adapted for AC power connection In one embodiment the first removable module has a second externally accessible connector corresponding to said first externally accessible connector. The second externally accessible connector provides for further expansion modules. In one embodiment, the externally accessible connectors have fourteen data connections and one radio frequency connection.

In one embodiment, the first removable module has a connector extending from a front of the first removable module adapted to mate with the first externally accessible connector of the communication device and a module externally accessible connector corresponding to said externally accessible connector of the communication device adapted to receive a connector of a second removable module. In one embodiment, the first removable module is an extension battery which supplies power to the communication device. In another embodiment, the removable module is adapted to recharge a battery within the communication device. In yet another embodiment, the first removable module is an extension battery and the second removable module is a connector to a battery charging device. Preferably, the extension battery may be any one of many batteries such as a Lithium Polymer battery, a Lithium Ion battery, a Nickel Metal Hydride battery, a Nickel Cadmium battery, an Alkaline battery or a rechargeable alkaline battery. Advantageously, the extension battery is between 2.0 mm to 8.0 mm thick in one embodiment.

In one embodiment, the voltage of the extension battery may be stepped up or down to accommodate the voltage level of the communication device.

In another embodiment, the removable extension module comprises a connector adapted to mate with the first externally accessible connector and a flexible communication cable attached in communication with the connector. The flexible connector is adapted to connect to a laptop, a battery charger, or a power supply.

Another aspect of the present invention involves an extension module for use with a portable communication device, the portable communication device having a housing containing a circuit board and having a first externally accessible connector mounted perpendicular to and on the circuit board. The extension module has a connector adapted to mate with said first externally accessible connector. The extension module comprises a battery, a power supply connection, a communication connection, or a combination of these. The extension module may have a flexible communication cable adapted to be connected to a computer. In one embodiment, the extension has a second externally accessible connector corresponding to said first externally accessible connector and adapted to receive another extension module, in a stacked configuration.

DETAILED DESCRIPTION OF THE PREFERRED EMBODIMENTS

The present invention relates to an improved external connector and a battery extension pack for a portable communication device. In a preferred embodiment, the portable communication device is a folding, two-part cellular phone with an integrated battery compartment in the folding hinge of the phone. Preferred embodiments of the folding cellular phone with an integrated battery compartment are disclosed in U.S. patent application Ser. No. 09/073,724 entitled Integrated Battery Compartment and Hinge filed on May 7, 1998, the disclosure of which is incorporated herein by reference. Alternatively, the present invention may be embodied in other portable communication devices that do not fold and/or do not have an integrated battery compartment in the hinge.

Figure 1:
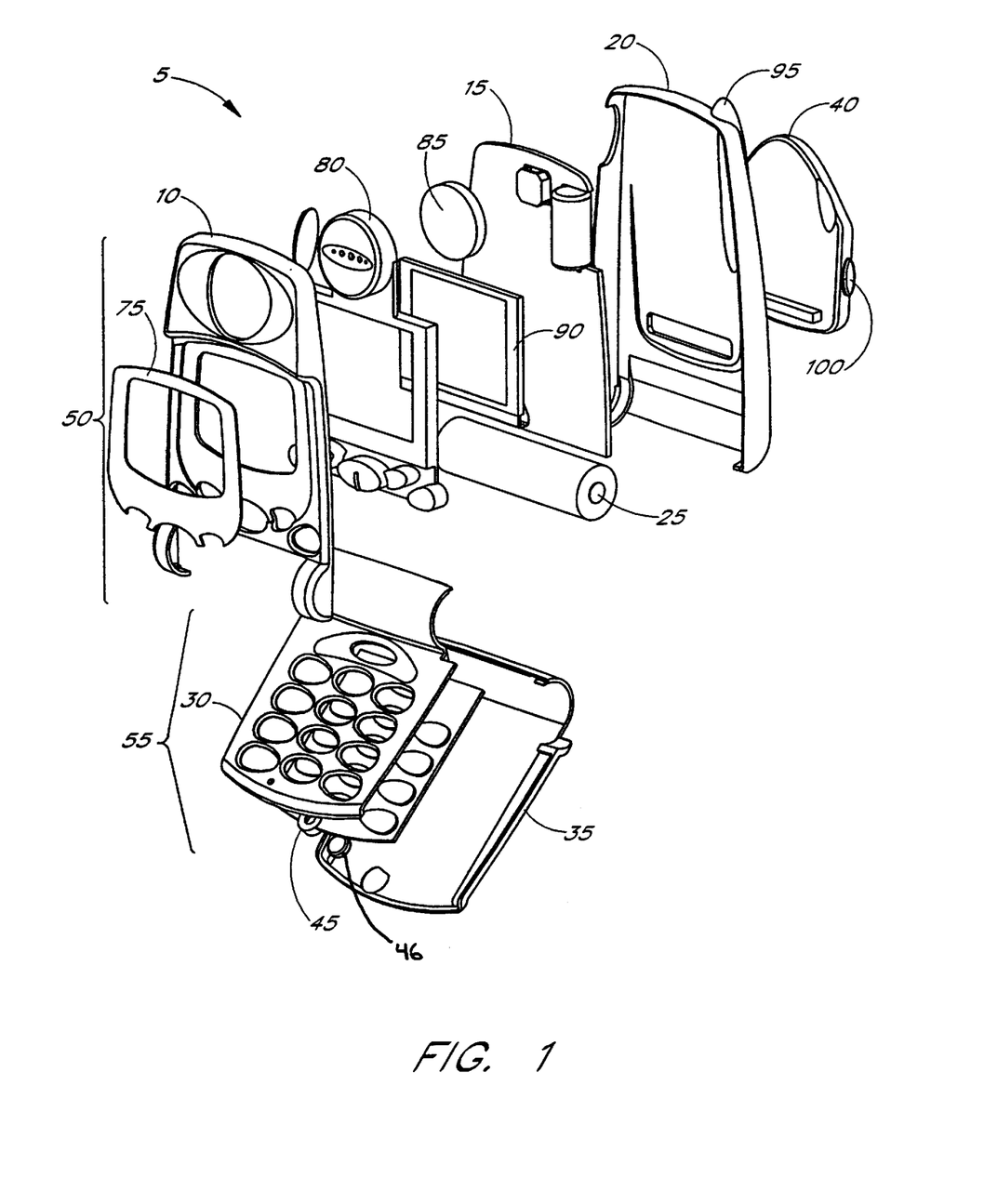
FIG. 1 is an exploded view of a portable communication device and a battery extension pack in accordance with a preferred embodiment of the present invention.

FIG. 1 is an exploded view of a portable communication device 5 and a battery extension pack 40 in accordance with a preferred embodiment of the present invention. The portable communication device 5 comprises a top half 50 and a bottom half 55. The top half 50 comprises a front lens 75, a front top housing 10, speaker cover and menu pad 80, a speaker 85, a liquid crystal, display (LCD) 90, a circuit board 15, an antenna 95 and a top rear housing (or back plate) 20 which is adapted to receive a battery extension pack 40. The bottom half 55 includes a bottom front housing 30, a keypad 45, microphon, 46, and a bottom rear housing 35. In a preferred embodiment, the communication device also includes an integrated battery compartment for a battery 25 such as a 3.6 volt Lithium Ion battery.

Figure 2A:
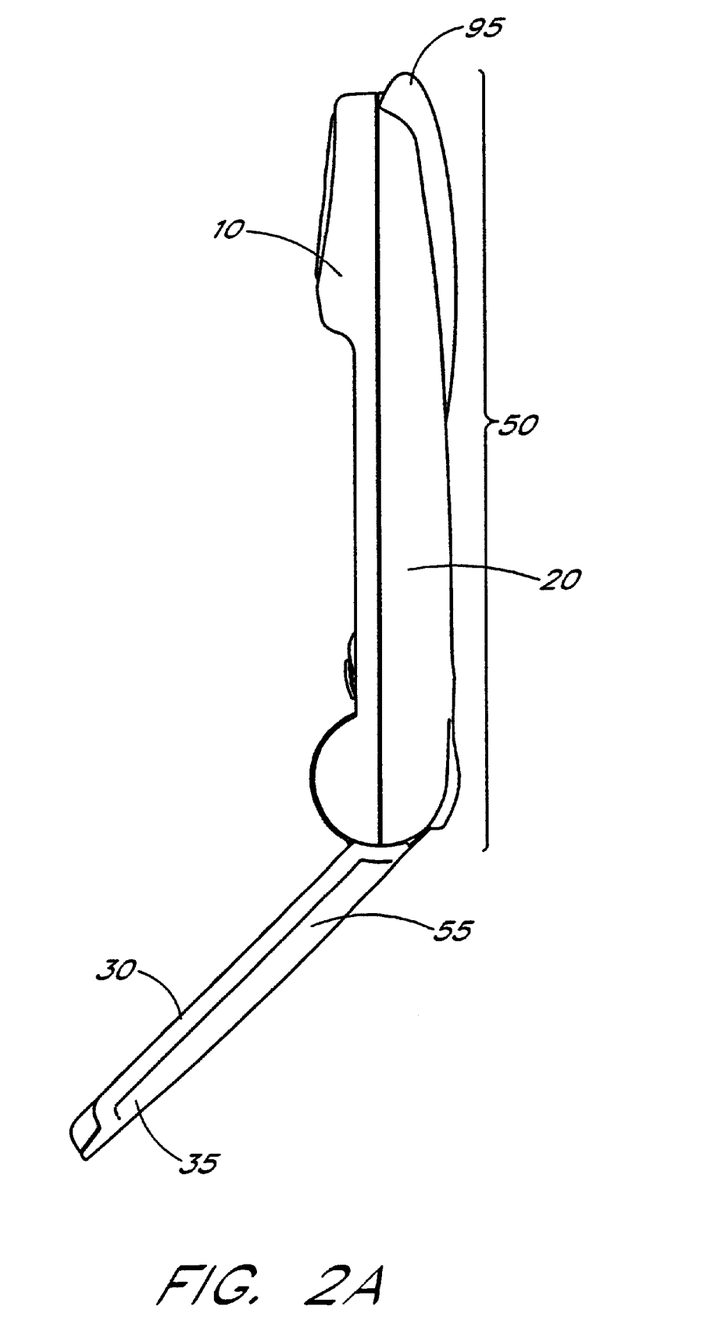
FIG. 2A is a side view of the portable communication device illustrated in FIG. 1.
Figure 2B:
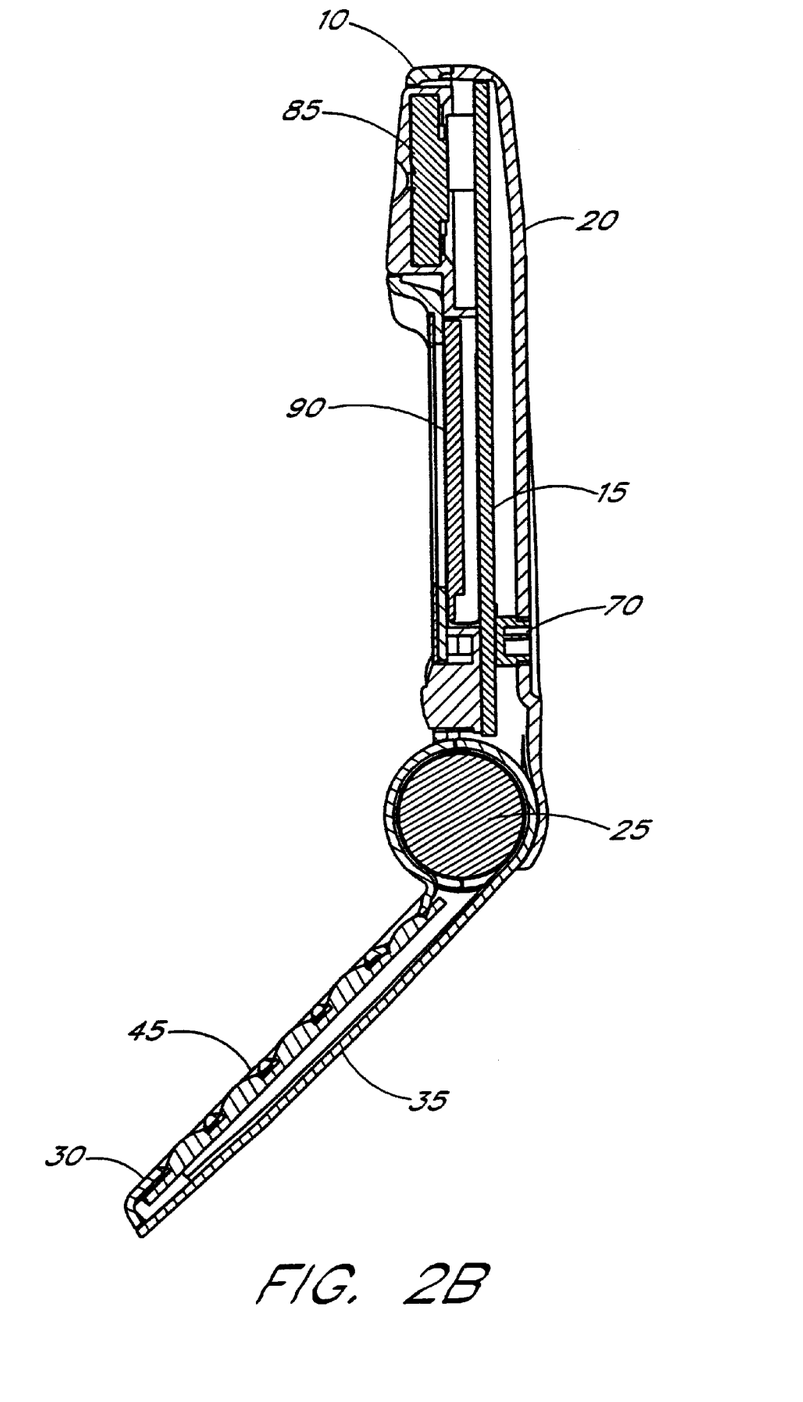
FIG. 2B is a cross-sectional side view of the device illustrated in FIG. 2A.

FIG. 2A is a side view of the portable communication device 5 illustrated in FIG. 1. FIG. 2B is a cross-sectional side view of the device 5 illustrated in FIG. 2A. As shown in FIG. 2B, the external system connector 70 is perpendicular to the backplate 20 of the device 5. The system connector 70 is placed directly on the circuit board 15. The connect can be soldered or otherwise bonded to the circuit 6 and 15. This configuration reduces the size of the 'footprint' of the system connector 70 on the circuit board 15 as compared to conventional connectors. The system connector 70 is a female-type connector adapted to receive a male-type connector, such as the male-type connector 140 on the battery extension pack 40 shown in FIG. 3B, or the male-type connector 135 on the system connector pack 60 shown in FIG. 4B. This system connector 70 is preferably a common interface connector with fourteen data connections and one radio frequency (RF) connection. Other configurations for the particular connector may also be used.

The system connector 70 shown in FIG. 2A may be used for a variety of functions. For example, in one preferred embodiment, the connector 70 may be used to recharge the battery 25 within the hinge of the device 5. Examples of battery cells include Lithium Ion, Lithium Polymer, Nickel Metal Hydride, Nickel Cadmium, and possibly Alkaline. The system connector 70 may also be used to transfer data to a laptop computer or other device and to provide an external antenna. Other functions of an external connector are known in the art.

Figure 2C:
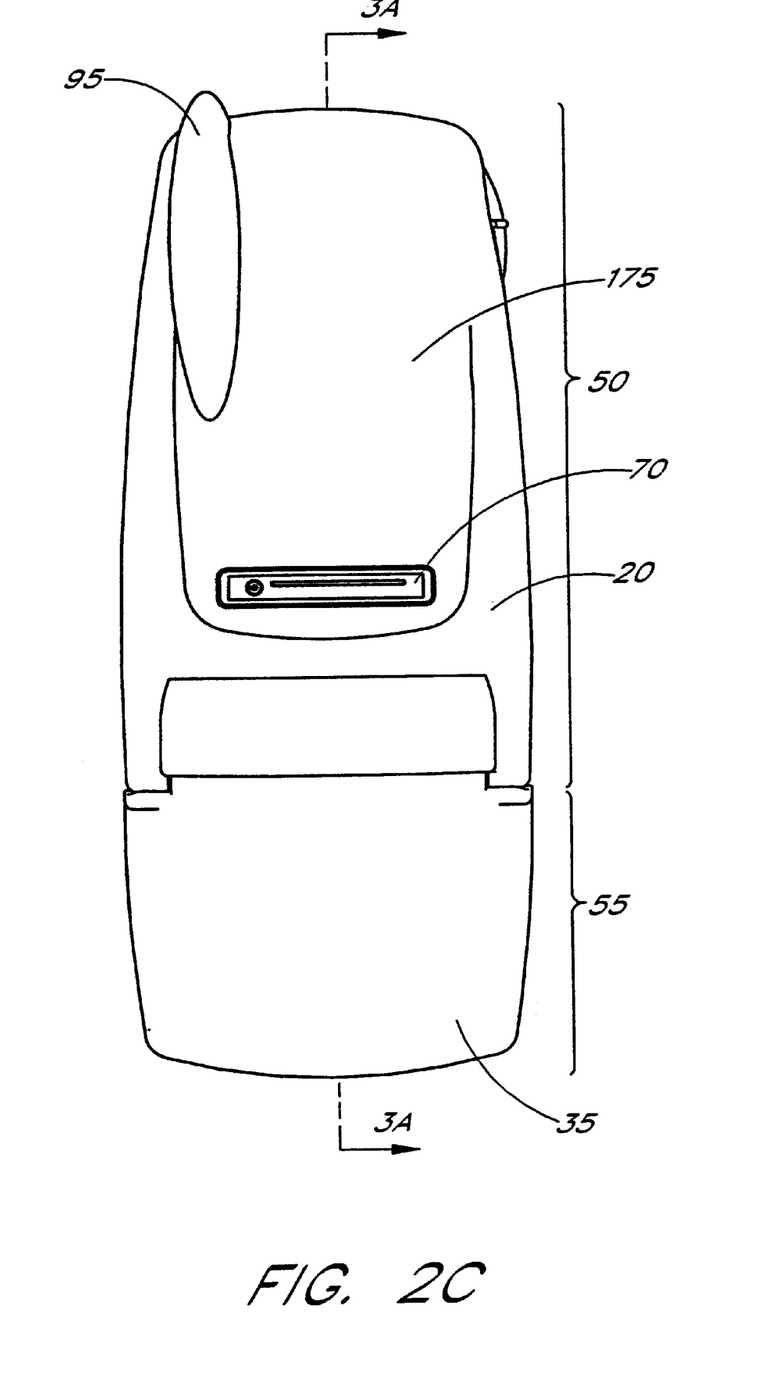
FIG. 2C illustrates the back of the portable communication device depicted in FIG. 1.

The communication device 5 in FIG. 1 allows multiple removable modules, such as battery extension packs, battery rechargers or system connector packs, to be placed on the backplate 20 of the device 5. FIG. 2C illustrates the back of the portable communication device 5 depicted in FIG. 1. As shown in FIG. 3C, a groove 125 is formed on the backplate 20 of the device 5. This groove 125 is adapted to receive a battery extension pack 40 (shown in FIGS. 5A–5D), a system connector pack 60 (shown in FIGS. 6A–6D), or other removable module used for data or power transmission. The device 5 is also well suited for cradle mounting.

Figure 3A:
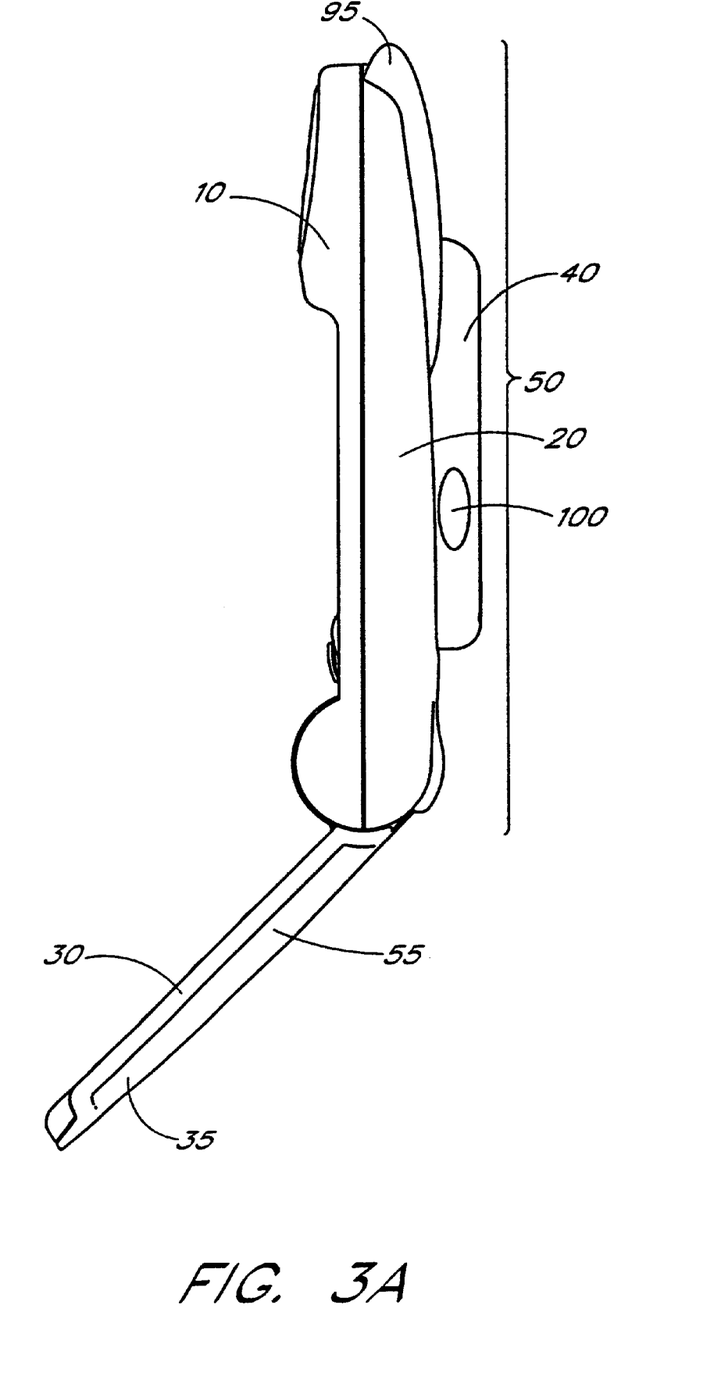
FIG. 3A is a side view of the portable communication device with the battery extension pack illustrated in FIG. 1.
Figure 3B:
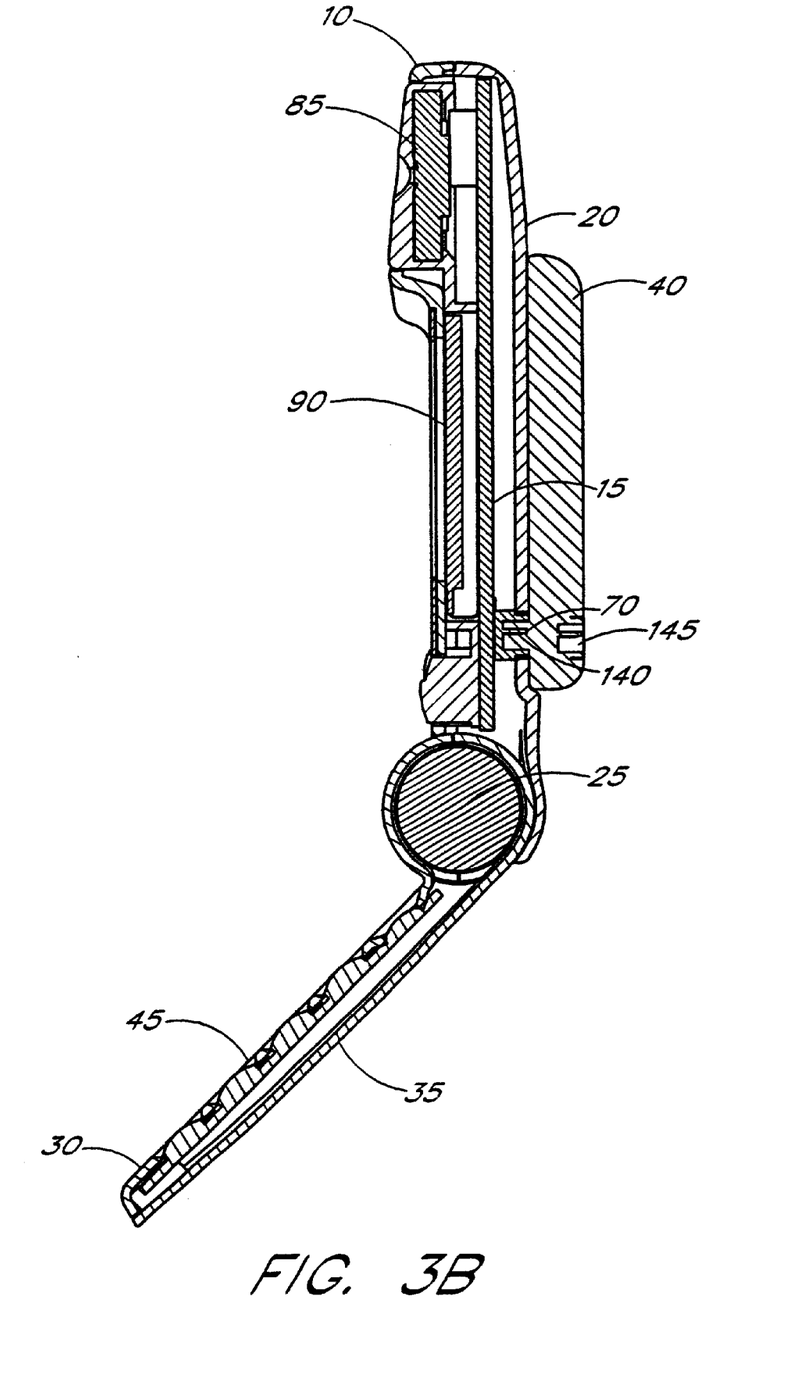
FIG. 3B is a cross-sectional side view of the device and battery extension pack illustrated in FIG. 3A.
Figure 3C:
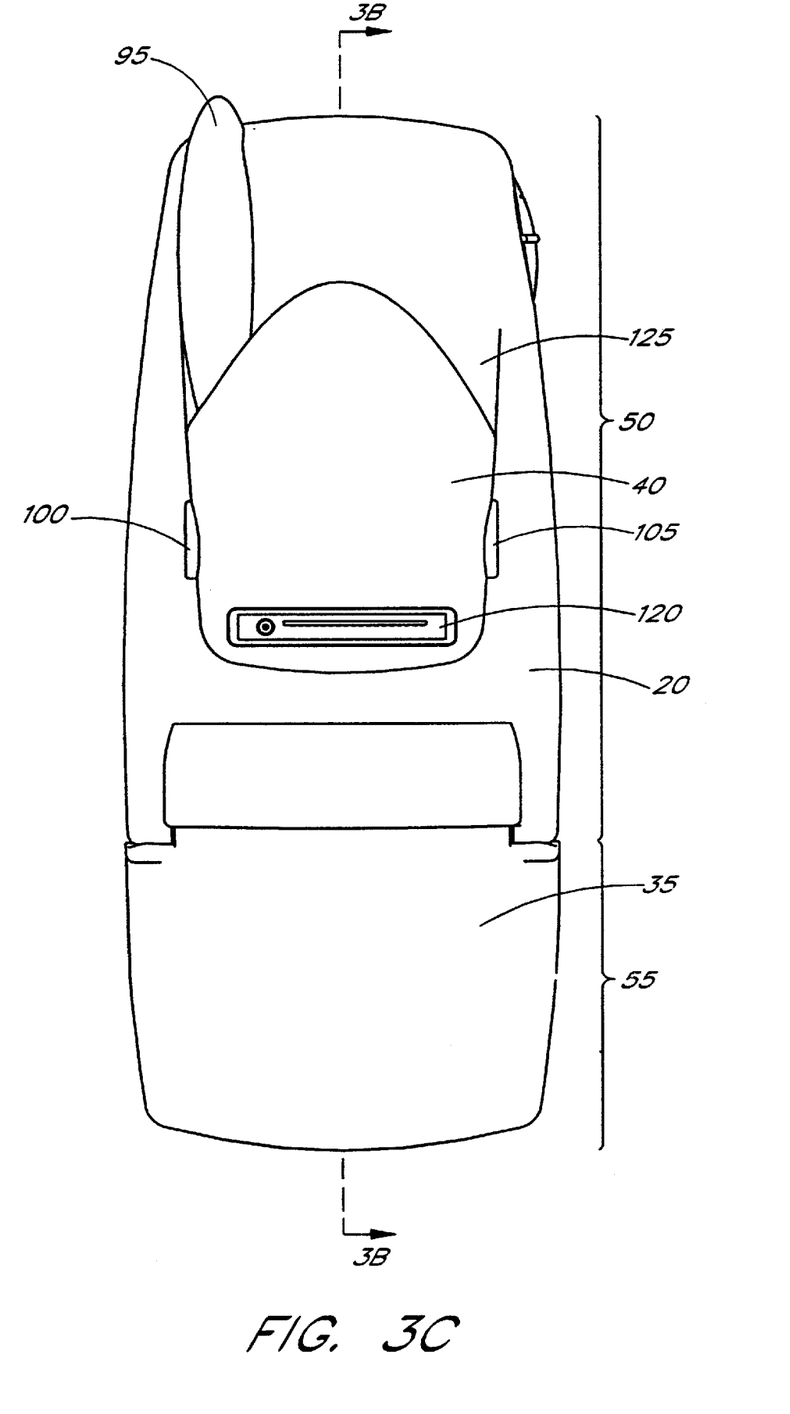
FIG. 3C illustrates the back of the portable communication device and battery extension pack depicted in FIG. 3A.

FIG. 3A is a side view of the portable communication device 5 with a battery extension pack 40. FIG. 3B is a cross-sectional side view of the device 5 and the battery extension pack 40. FIG. 3C illustrates the back of the device 5 and the battery extension pack 40. FIGS. 5A–5D illustrate various views of the battery extension pack 40. As shown in FIGS. 5A–5D, the battery extension pack 40 comprises a main portion 41, a left release button 100, a right releasor button 105, an interface connector 140 on the front 42 of the main portion 41. An interface connector 120 may be optionally provided on the back 44 of the main portion 41 to permit further connection. The optional interface connector 120, in the present embodiment, is a replica of the interface connector 70 for the phone 5. The optional interface connector 120 simply couples through to the interface connector 70 on the phone 5 to provide a path for the connector 70 to maintain an external connector corresponding to the signals in the connector 70 which is accessible when the extension battery 40 is connected to the phone 5. However, it is not necessary to provide the extension interface connector 120 on the battery. The battery could simply connect to the connector 70 of the phone 5 and provide additional power.

In the present embodiment, the connector 140 on the extension battery 40 is configured to mate with the interface connector 70 on the phone 5.

The left and right release buttons 100, 105 are spring-activated and are adapted to attach or remove the battery extension pack 40. When the user presses both release buttons 100, 105 simultaneously, the connector 140 of the battery extension pack 40 engages or disengages from the connector 70 of the device 5. The release buttons 100, 105 operate such that the connector 140 will not disengage if only one of the releasor buttons 100, 105 is depressed. This prevents the battery extension pack 40 from accidentally detaching from the back 20 of the communication device 5. In another embodiment, alternative release mechanisms could be provided with the extension packs for the phone 5 or simply friction insertion force connectors could be used with no release mechanism.

In a preferred embodiment, the battery extension pack 40 is a lithium polymer cell, and the main portion 41 is approximately 2.5 to 3 mm thick. The lithium polymer battery can also be formed to fit a curved profile. In another preferred embodiment, the battery extension pack 40 is a Lithium Ion cell, and the main portion 41 is approximately 6 to 8 mm thick. The lithium polymer battery extension pack can be fabricated in a much thinner profile than the lithium ion battery extension pack, and still provide sufficient power.

In other embodiments, the battery extension pack 40 may be Nickel Metal Hydride, Nickel Cadmium, and possibly Alkaline. In one embodiment, the battery extension pack voltages could be stepped up or down within the pack 40 to accommodate the voltage level of the communication device 5.

The battery extension pack 40 is preferably 'stackable' such that multiple battery extension packs may be stacked one on top of another. Because of the slim configuration of the battery extension pack 40 (between 2.5 to 3 mm in one embodiment), multiple battery packs may be used while maintaining the thin profile of the overall operating device. Furthermore, the battery extension pack 40 may be standardized for a range of different communication devices, and thus eliminate additional tooling costs to design new battery pack configurations for each new communication device.

Figure 4A:
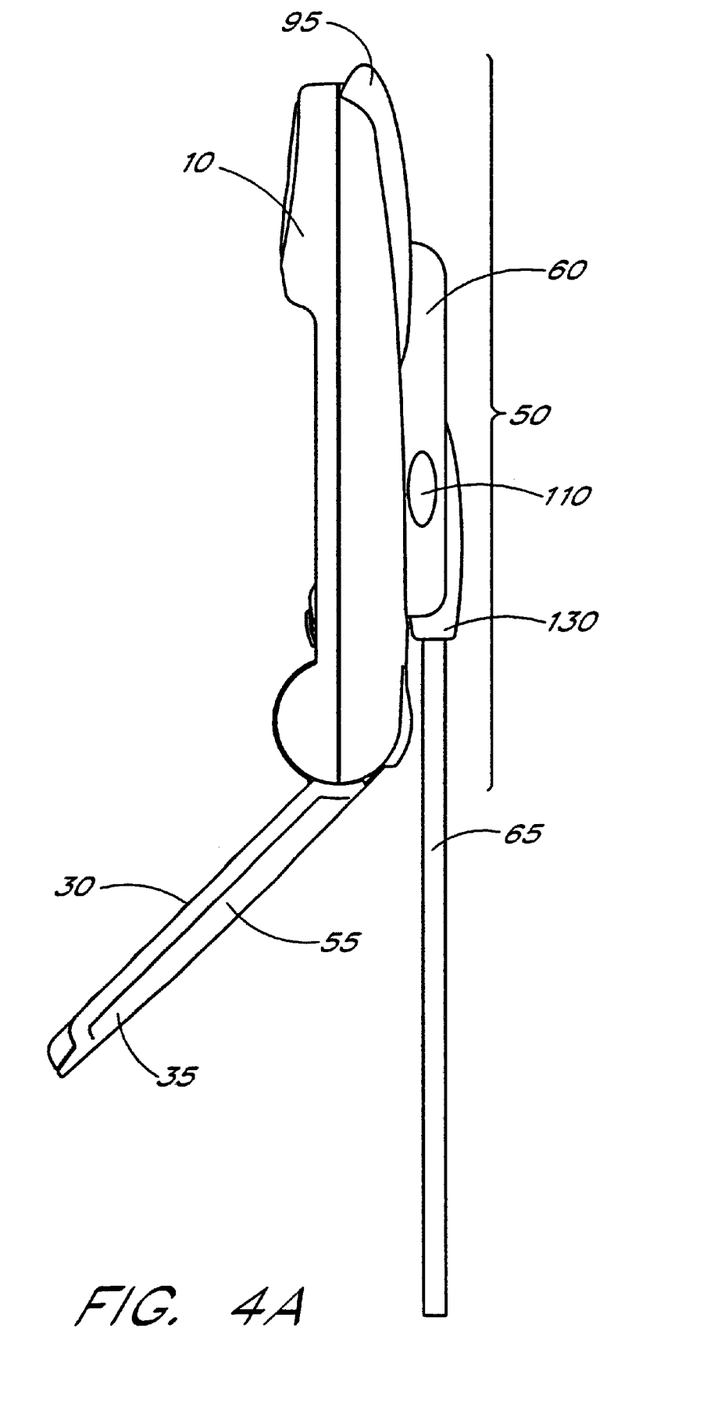
FIG. 4A is a side view of the portable communication device illustrated in FIG. 1 with a system connector pack.
Figure 4B:
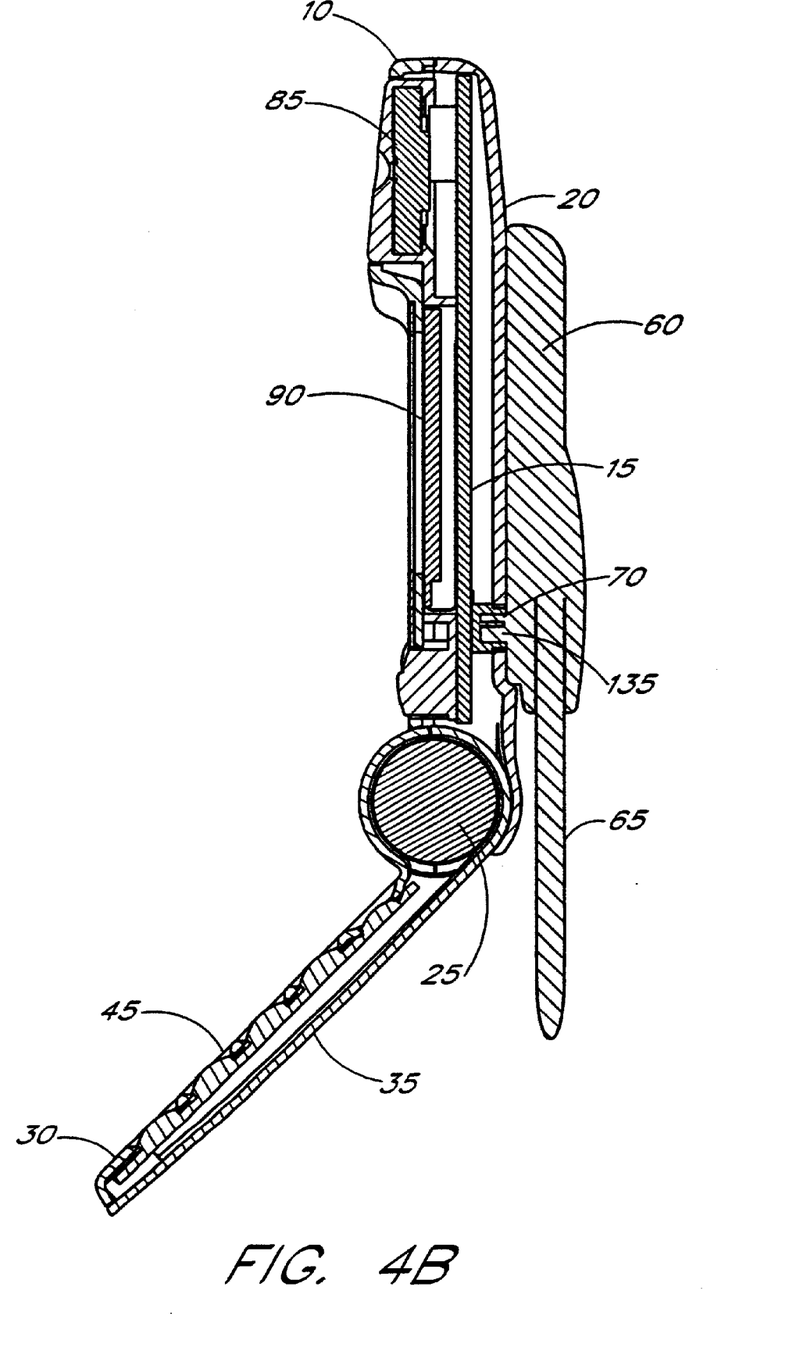
FIG. 4B is a cross-sectional side view of the device and system connector pack illustrated in FIG. 4A.
Figure 4C:
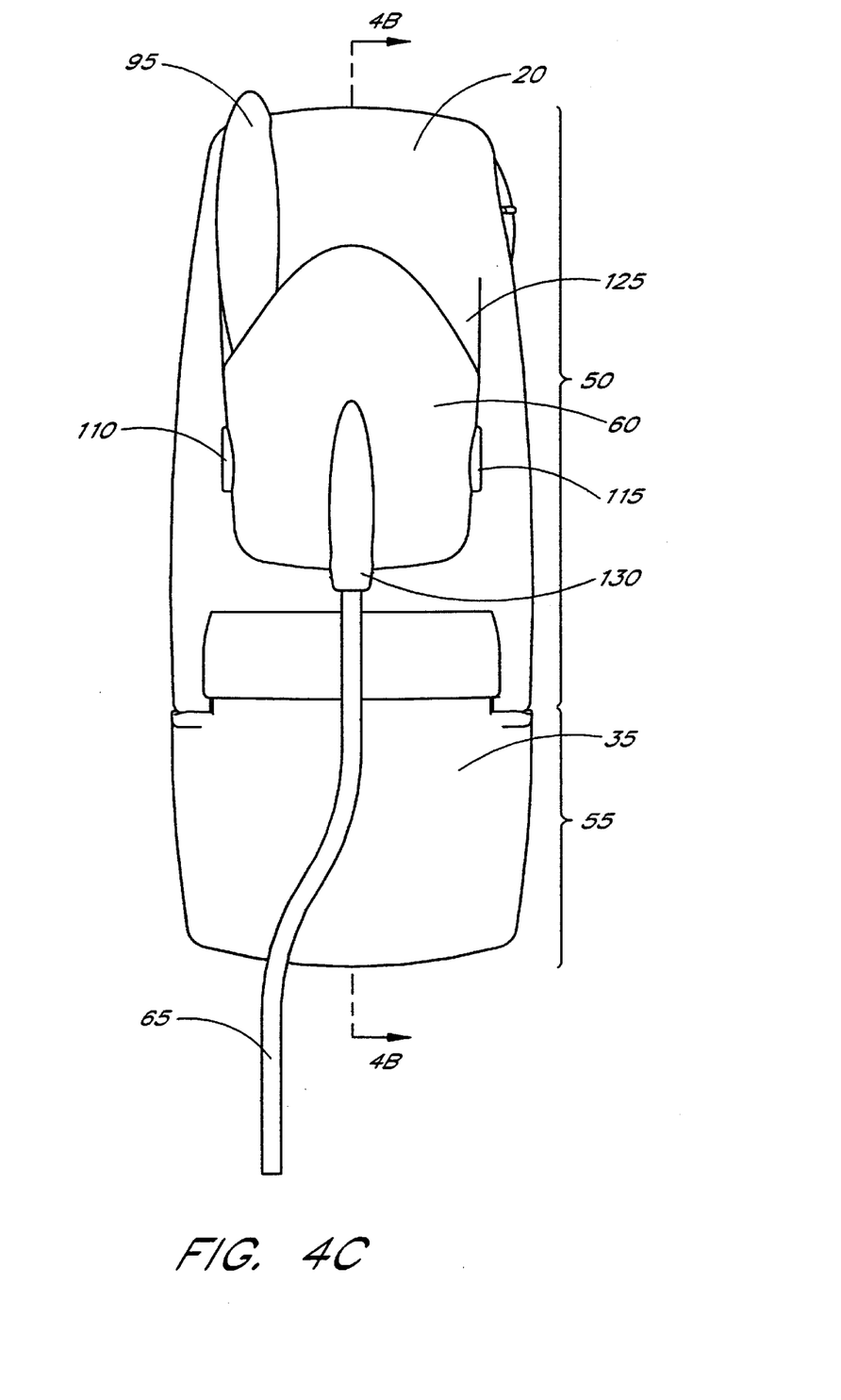
FIG. 4C illustrates the back of the portable communication device and system connector pack depicted in FIG. 4A.
Figure 5A:
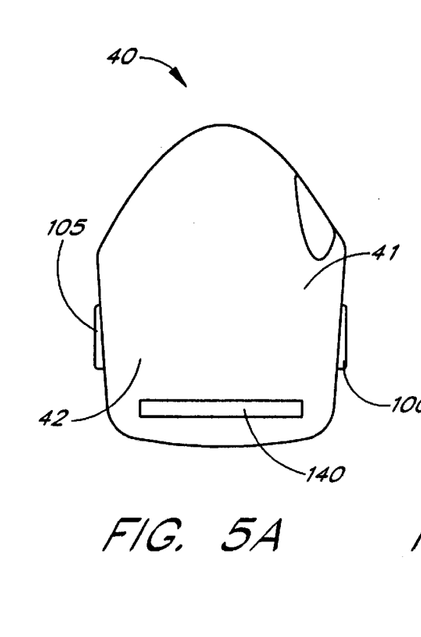
FIGS. 5A–5D illustrate various views of the battery extension pack depicted in FIG. 1.
Figures 5B, 5C:
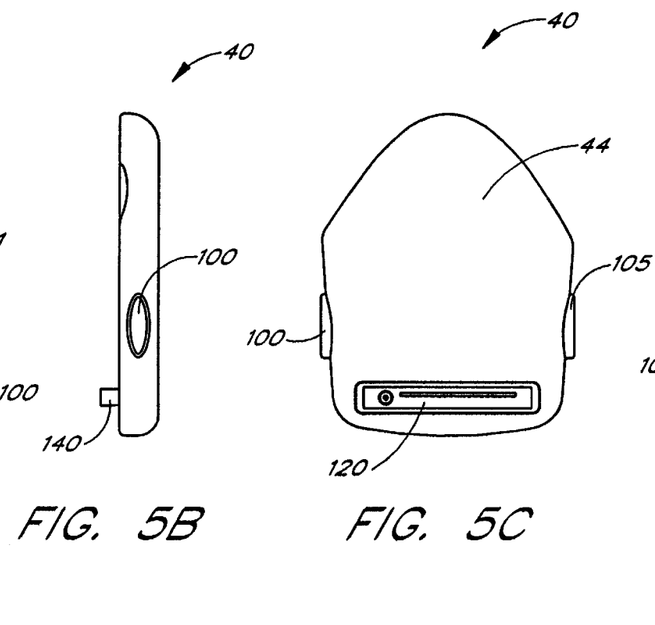
Figure 5D:
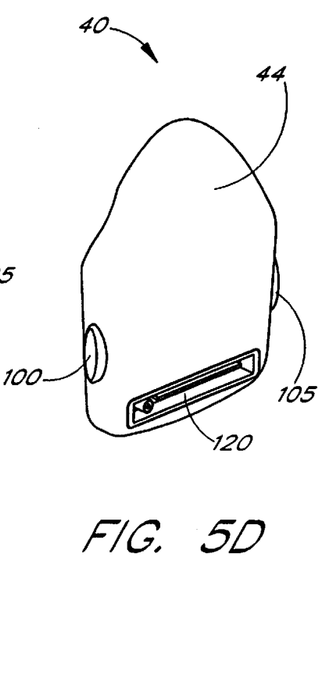
Figures 6A, 6B:
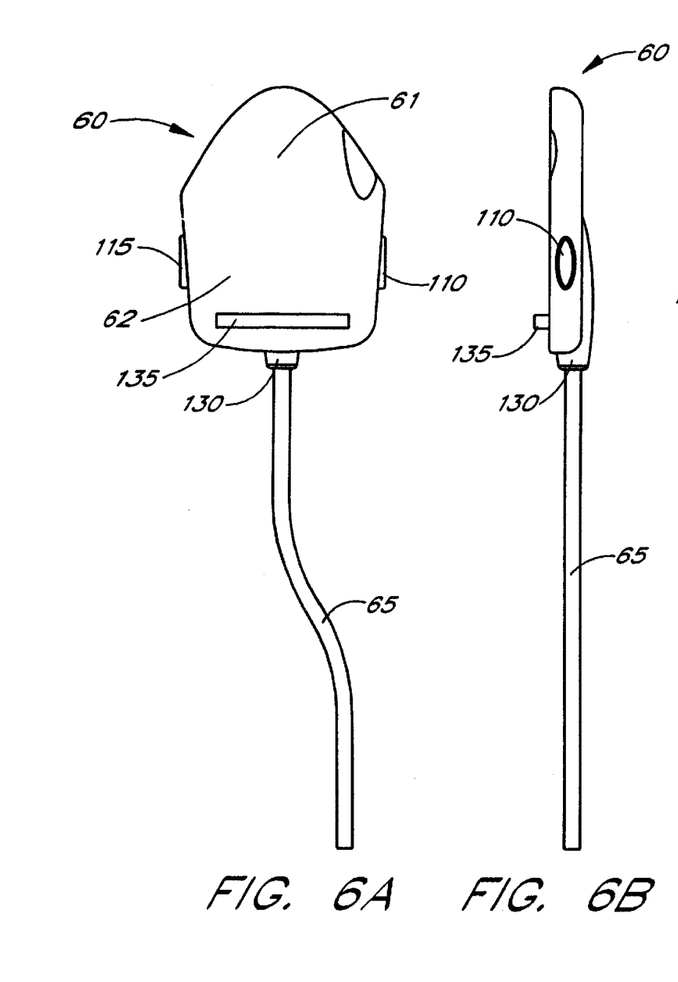
FIGS. 6A–6D illustrate various views of the system connector pack depicted in FIG. 4A.
Figure 6C:
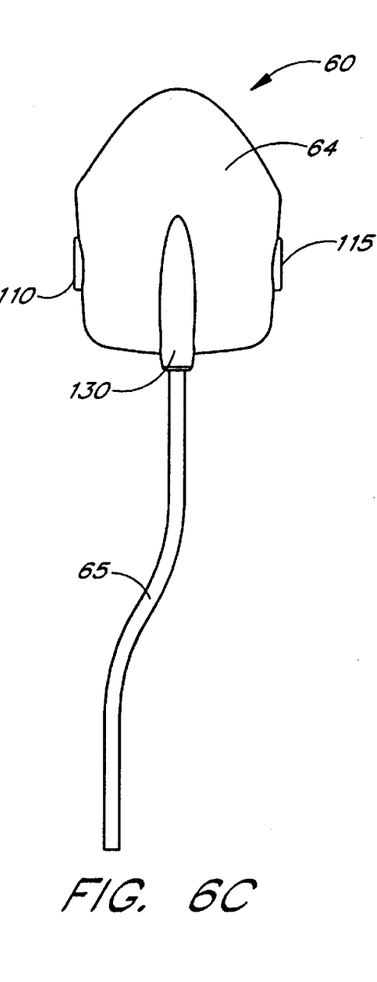
Figure 6D:
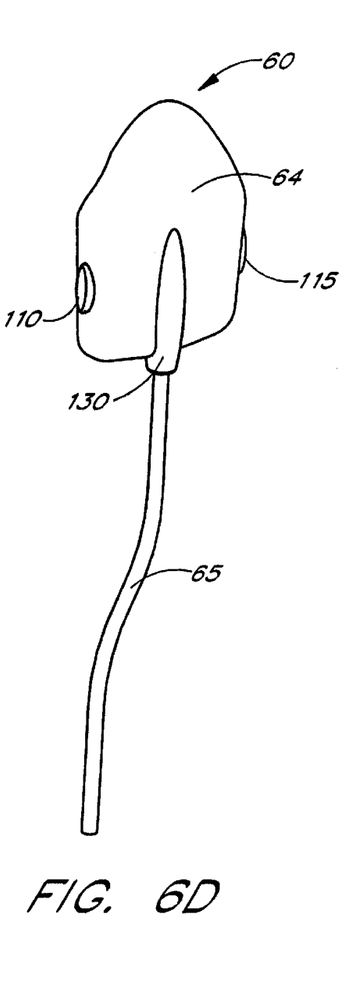

FIG. 4A is a side view of the portable communication device 5 illustrated in FIG. 1 with a system connector pack 60. FIG. 4B is a cross-sectional side view of the communication device 5 and system connector pack 60. FIG. 4C illustrates the back of the communication device 5 and the system connector pack 60. FIGS. 6A–6D illustrate various views of the system connector pack 60 depicted in FIG. 4A. As shown in FIGS. 6A–6D, the system connector pack comprises a main portion 61, a left release button 110, a right release button 115, an interface connector 135 on the front 62 of the main portion 61, a flexible system cable 65 and a sheath 130 for the flexible system cable 65. In one embodiment (not shown), there is an expansion interface connector on the back 64 of the main portion 61. As with the battery extension pack, the interface connector 135 is adapted to mate with the interface connector 70 of the portable communication device 5. Accordingly, through the connection, various functions typically available to a portable communication device through its external connectors can be provided, as well known in the art.

Similar to the battery extension pack 40 described above, the left and right release buttons 110, 115 are spring-activated and are adapted to attach or remove the system connector pack 60. The operation of the system connector pack's release buttons 110, 115 are similar to the operation of the battery extension pack's release buttons 100, 105.

The system connector pack 60 interfaces with the system connector 70 on the backplate 20 of the communication device 5. The distal end of the flexible system cable 65 may be plugged into a variety of products or outlets that transfer data or power, such as a laptop computer (via a RS232 or PCMCIA interface), a cigarette lighter adapter for automobiles, or a battery recharger. The system connector pack 60 can be used to recharge the battery 25.

Figure 7:
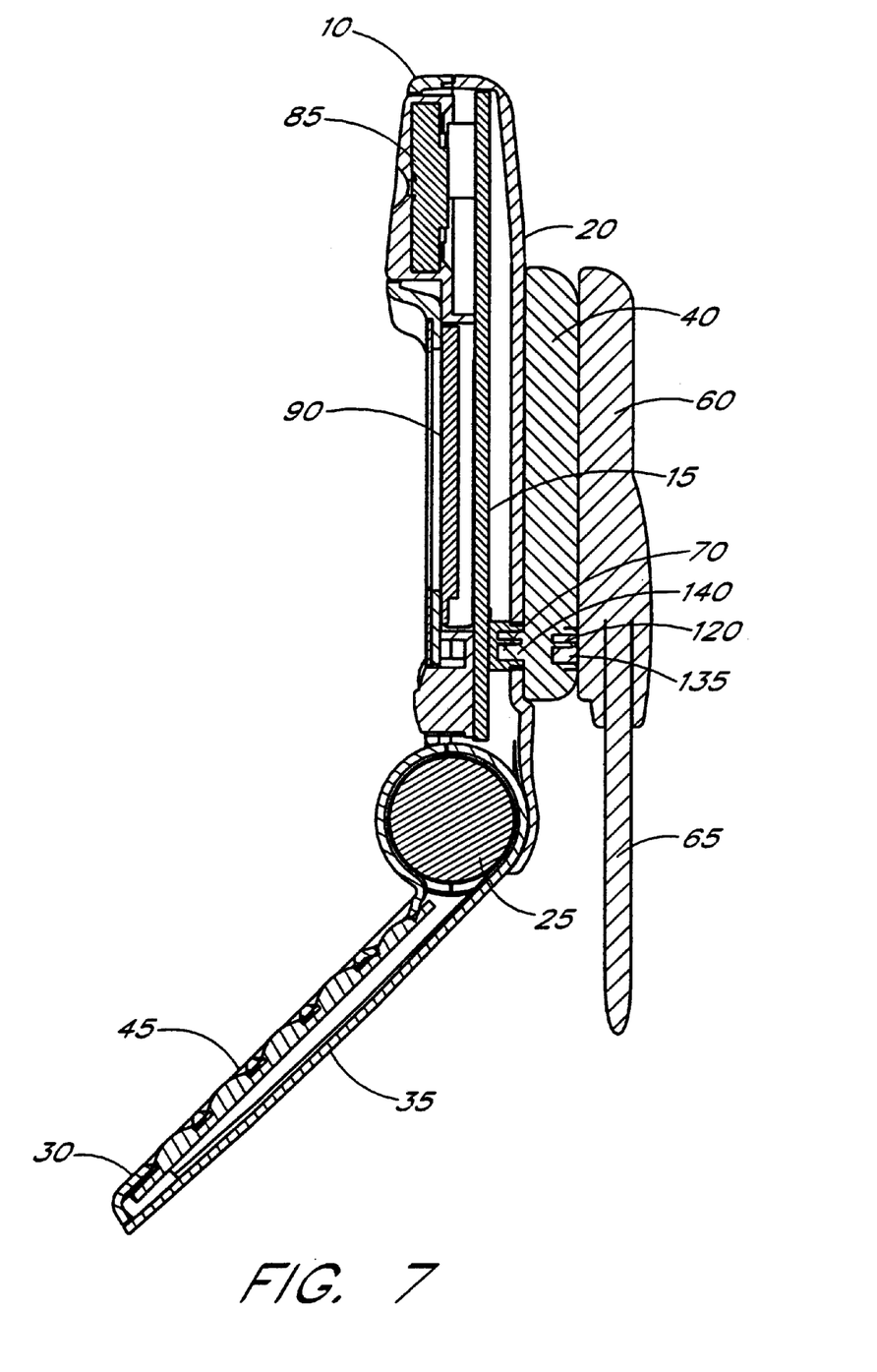
FIG. 7 illustrates the portable communication device and battery extension pack illustrated in FIG. 1 and a system connector pack attached to the battery extension pack.

FIG. 7 illustrates the portable communication device 5 with a battery extension pack 40 and a system connector pack 60 attached to the back 44 of the battery extension pack 40. In this position, the system connector pack 60 can be used to recharge the battery 25 and/or the battery extension pack 40.

While embodiments and applications of this invention have been shown and described, it will be apparent to those skilled in the art that various modifications are possible without departing from the scope of the invention. It is, therefore, to be understood that within the scope of the appended claims, this invention may be practiced otherwise than as specifically described.

What is claimed:

1. A portable communication device comprising;
   a housing having a front side and a back side;
   a circuit board mounted within said housing and having a plane extending between the front side and the back side; and
   a first externally accessible connector mounted directly on the circuit board within the portable communication device, so that the first externally accessible connector extends substantially perpendicular from the plane of the circuit board and faces the back side of the housing so that the first externally accessible connector Is configured to receive a corresponding connector in substantially perpendicular direction, wherein the first externally accessible connector comprises a first portion for conducting power and a second portion for transferring data, and wherein the first accessible connector is configured to releasably couple to a power supply and a data processing device.

2. The portable communication device of claim 1, wherein the communication device is a folding cellular phone.

3. The portable communication device of claim 2, further comprising an integrated battery compartment in a hinge of the phone.

4. The portable communication device of claim 3, wherein said externally accessible connector is adapted to connect with a first removable module, said removable module having a module externally accessible connector corresponding to said first externally accessible connector.

5. The portable communication device of claim 4, wherein the external accessible connector is adapted to receive a mating connector on said removable module, said externally accessible connector comprising fourteen data connections and one radio frequency connection.

6. The portable communication device of claim 5, wherein said module externally accessible connector is adapted to connect with a second removable module, stacked upon said removable module.

7. The portable communication device of claim 3, further comprising a first removable module comprising:
a connector extending from a front of said first removable module adapted to mate with the externally accessible connector of the communication device; and
a module externally accessible connector corresponding to said externally accessible connector of the communication device adapted to receive a connector of a second removable module.

8. The portable communication device of claim 7, wherein at least said first removable modules is a battery extension pack which supplies power to the communication device.

9. The portable communication device of claim 7, wherein at least said first removable module is adapted to recharge a battery within the communication device.

10. The portable communication device of claim 7, wherein said first removable module is an extension battery arid wherein said second removable module is a connector to a battery charging device.

11. The portable communication device of claim 7, wherein the extension battery pack is a Lithium Polymer battery.

12. The portable communication device of claim 7, wherein said extension battery is between 2.0 mm to 8.0 mm thick.

13. The portable communication device of claim 12, wherein the extension battery is a Lithium Ion cell.

14. The portable communication device of claim 12, wherein the extension battery is a Lithium Polymer battery.

15. The portable communication device of claim 7, wherein the extension battery is a Nickel Metal Hydride cell.

16. The portable communication device of claim 7, wherein the battery extension pack is a Nickel Cadmium cell.

17. The portable communication device of claim 7, wherein the extension battery is an Alkaline cell.

18. The portable communication device of claim 7, wherein a voltage of the extension battery may be stepped up or down to accommodate the voltage level of the communication device.

19. The portable communication device of claim 1, wherein a said externally accessible connector extends through back side of said housing.

20. The portable communication device of claim 1, wherein said externally accessible connector is adapted to receive a removable expansion module.

21. The portable communication device of claim 20, wherein said expansion module is a removable power source.

22. The portable communication device of claim 21, wherein said external, removable power source comprises an external battery.

23. The portable communication device of claim 21, wherein said external, removable power source is a power adapter.

24. The portable communication device of claim 23, wherein said power adapter comprises an adapter connector configured to mate with said externally accessible connector and a power cord.

25. The portable communication device of claim 24, wherein said power cord is adapted for connection to a cigarette lighter receptacle.

26. The portable communication device of claim 24, wherein said power cord is coupled to a battery charger operable using AC power.

27. The portable communications device of claim 20, wherein the removable extension module comprises a connector adapted to mate with said externally accessible connector and a flexible communications cable attached in communication with said connector.

28. The portable communication device of claim 27, wherein the flexible communication cable is adapted to connect to a laptop computer.

29. The portable communication device of claim 28, wherein the flexible communication cable is adapted to connect to a battery recharger, said battery recharger being capable of recharging a battery for the communication device.

30. An extension module for use with a portable communication device, said portable communication device having a housing having a front side and a back side and containing a circuit board having a plane extending between the front side and the back side, said portable communication device further having a first externally accessible connector mounted directly on the circuit board, wherein the first externally accessible connector extends substantially perpendicular from the plane of the circuit board and faces the back side of the housing and wherein the first externally accessible connector is configured to receive a corresponding connector In substantially perpendicular direction, said extension module comprising:
a connector adapted to mate with said first externally accessible connector, wherein the first externally accessible connector comprises a first portion for conducting power and a second portion for transferring data, and wherein the first accessible connector is configured to releasably couple to a power supply and a data processing device.

31. The extension module of claim 30, wherein said extension module comprises a battery.

32. The extension module of claim 30, wherein said extension module comprises a communication connection for said portable communication device.

33. The extension module of claim 32, wherein said communication connection has a flexible communication cable adapted to be connected to a computer.

34. The extension module of claim 30, further comprising a second externally accessible connector corresponding to said first externally accessible connector, said second externally accessible connector adapted to receive another extension module, in a stacked configuration.

35. A portable communication device, comprising;

a housing having a front side and a back side;

a circuit board mounted within said housing and having a plane extending between the front side and the back side;

a first externally accessible connector mounted directly on the circuit board within the portable communication device, so that the first externally accessible connector extends substantially perpendicular from the plane of the circuit board and faces the back side of the housing, wherein the first externally accessible connector comprises a first portion for conducting power and a second portion for transferring data, and wherein the first accessible connector is configured to releasably couple to a power supply and a data processing device;

a first removable module having a first mating connector configured to couple to the first externally accessible connector so that the first removable module is mountable to the back side of the housing; and a second removable module having a second mating connector to couple to the first removable module so that the second removable module is mountable to a back side of the first removable module.

36. The portable communication device of claim 35, wherein at least the first removable module is a battery extension pack which supplies power to the communication device.

37. The portable communication device of 35, wherein the first removable module is an extension battery and wherein the second removable module is a connector to a battery charging device.

* * * * *

UNITED STATES PATENT AND TRADEMARK OFFICE
CERTIFICATE OF CORRECTION

PATENT NO.   : 6,385,468 B2
DATED        : May 7, 2002
INVENTOR(S)  : Thomas A. Arnold It is certified that error appears in the above-identified patent and that said Letters Patent is hereby corrected as shown below:

Column 7,
Line 39, please change "arid wherein" to -- and wherein --.

Signed and Sealed this

Thirteenth Day of May, 2003

JAMES E. ROGAN
*Director of the United States Patent and Trademark Office*